US007693165B2

(12) United States Patent
Xu

(10) Patent No.: US 7,693,165 B2
(45) Date of Patent: Apr. 6, 2010

(54) DATA PROCESSING METHOD AND DEVICE

(75) Inventor: Yaowei Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 193 days.

(21) Appl. No.: 12/004,044

(22) Filed: Dec. 20, 2007

(65) Prior Publication Data
US 2008/0130665 A1    Jun. 5, 2008

Related U.S. Application Data

(63) Continuation of application No. PCT/CN2006/002429, filed on Sep. 18, 2006.

(30) Foreign Application Priority Data

Nov. 1, 2005    (CN) .................... 2005 1 0100945

(51) Int. Cl.
*H04L 12/28* (2006.01)
(52) U.S. Cl. .................... 370/401; 726/11; 726/13; 726/14; 726/15
(58) Field of Classification Search ............ None
See application file for complete search history.

(56) References Cited

U.S. PATENT DOCUMENTS 6,219,706 B1 * 4/2001 Fan et al. .................... 709/225
7,054,637 B2 * 5/2006 Weigand .................... 455/445
2003/0081607 A1 * 5/2003 Kavanagh .................... 370/392
2003/0117983 A1    6/2003 Ton et al.
2004/0228335 A1   11/2004 Park et al.
2005/0165928 A1 * 7/2005 Shu et al. .................... 709/224
2007/0192846 A1 * 8/2007 Thai et al. .................... 726/12

FOREIGN PATENT DOCUMENTS

EP    1 492 282 A2    12/2004

OTHER PUBLICATIONS

International Search Report from the Chinese Patent Office for International Application No. PCT/CN2006/002429.

* cited by examiner

*Primary Examiner*—Chirag G Shah
*Assistant Examiner*—Otis L Thompson, Jr.
(74) *Attorney, Agent, or Firm*—Finnegan, Henderson, Farabow, Garrett & Dunner, LLP

(57) ABSTRACT

A data processing method and device includes a data selecting unit of a GGSN selecting data received by the GGSN, which includes a GTP tunnel signaling packet and a normal data packet and performs corresponding processing in accordance with a type of the selected packet. A data information processing unit receives data transmitted from the data selecting unit and data transmitted from an external data network. The data selecting unit is added in the GGSN, so that the data with respect to the GTP tunnel is managed by categories, and the tunnel deleting notification packet is transmitted to the data information processing module in time, thus a wrong data forwarding is avoided, and the operation mode is simple. In other words, the data information processing module operates only in the routing mode; therefore, the failure rate of a single node is reduced, and the operation cost is lowered.

11 Claims, 4 Drawing Sheets

DATA PROCESSING METHOD AND DEVICE

The present application is a continuation of PCT application PCT/CN2006/002429, filed on Sep. 18, 2006, entitled "A METHOD AND APPARATUS FOR PROCESSING THE DATA", which is incorporated by reference herein in its entirety.

FIELD OF THE INVENTION

The present invention relates to the communication field and in particular to a data processing method and device between a General Packet Radio Service (GPRS) network and an external data network.

BACKGROUND OF THE INVENTION

A GPRS is an approach to transmit data through a radio network, and has been developed with the concept of "packet switching" based upon a Global System for Mobile Communication (GSM) network. As illustrated in FIG. 1, a GPRS network 110 is a bearing network, specifically a two-layer bearing network, built on a GSM network, and is used to bear three-layer data packets, similar to an Ethernet network 120, a token ring network (not shown) and a frame relay network 130.

Based upon an existing GSM network, a GPRS network is accomplished with addition of some nodes in the existing GSM network. As an important network node in the GPRS network, a GPRS Supporting Node (GSN) is capable of mobile route management, and is adapted to connect various kinds of data networks, connect GPRS registers, transfer data and convert format between a mobile station and various data networks. The GSN may be a separate apparatus like a router, and may also be integrated with a Mobile Switching Center (MSC) in the GSM.

The GSN may be classified into two types: one is a Serving GSN (SGSN), and the other is a Gateway GSN (GGSN). The SGSN is primarily used to record current position information of a mobile station, and to transmit and receive mobile packet data between the mobile station and the GGSN. The GGSN primarily functions as a gateway, and may be connected with various data networks, such as Integrated Service Digital Network (ISDN), Packet Switched Public Data Network (PSPDN) and Local Area Network (LAN). The GGSN is also referred to as GPRS router in some literatures. The GGSN may perform protocol conversion for GPRS data packet in the GSM network so as to transmit the GPRS data packet to a remote Transfer Control Protocol/Internet Protocol (TCP/IP) network or X.25 network.

During operation, the GPRS network performs addressing and sets up a data connection by means of route management. However, this approach has some problems. For instance, when a dynamic IP address which has assigned to a mobile station previously is reassigned to another MS, a traffic initiated by the previous MS which used the address may be passed to the new MS which obtains the address, consequently, the new MS may have to pay for the extra traffic while no traffic has been applied on its own initiative. In particular, the process includes the following.

1. A mobile station MS 1 obtains an IP address, requests a network service, and then a GPRS Tunnel Protocol (GTP) tunnel is set up between the SGSN and the GGSN, and a session connection is set up between the MS1 and a WEB server.

2. When the WEB server starts transmitting a data packet to the MS1, if the MS1 sends to the SGSN a request for deleting the GTP tunnel and has not interrupted the session with the WEB server on its own initiative, the GGSN will discard the received data packet due to the absence of the GTP tunnel.

3. A new mobile station MS2 sends to the SGSN a request for setting up a GTP tunnel to the GGSN. The MS2 obtains the same IP address, and the SGSN sets up a new GTP tunnel to the GGSN. Because it is still receiving a data packet with the same destination address, the GGSN will forward the data packet to the MS2 upon detecting the new GTP tunnel for the destination address. As a result, the MS2 has to pay for a traffic which has not been requested.

In the prior art, a solution as illustrated in FIG. 2 is disclosed. An apparatus 230 is disposed between an SGSN 210 and a GGSN 220 to detect the status of a GTP tunnel, and another apparatus 250 is disposed between the GGSN 220 and a WEB server 240 to detect the session status of a connection between an MS 260 and the WEB server 240. The apparatus 230 and another apparatus 250 may communicate with each other based on a certain protocol. The apparatus 230 obtains a GTP tunnel, and if detecting that the GTP tunnel is deleted, notifies another apparatus 250 of the deleted tunnel as well as session information between the MS 260 and the WEB server 240. In accordance with the received information, another apparatus 250 deletes the session table for the MS 260 and the WEB server 240, and discards packets transmitted from the WEB server 240 to the MS 260.

However, this solution may have the following disadvantages.

1. The apparatus 230 is required to support the obtaining of the GTP tunnel protocol. The data stream between the GGSN and the WEB server includes normal IP packets, while the data stream between the SGSN and the GGSN includes packets of GTP tunnel protocol. If the apparatus is capable of obtaining the GTP tunnel protocol, it may detect the status of the GTP tunnel. The apparatus not only has to support each GTP protocol version, but also has to perform version updating when the SGSN and the GGSN update a GTP protocol version.

2. The networking mode has some limitations. Upon detecting that the GTP tunnel is deleted, the apparatus 230 sends a notification packet to the apparatus 250 only in two ways: the packet is sent from the apparatus 230 to the apparatus 250 directly; or the packet from the apparatus 230 is forwarded to the apparatus 250 via the GGSN. If both end addresses of the GTP tunnel set up by the SGSN and the GGSN belong to the same network segment, the operating mode of the apparatus 230 may only be a transparent bridge mode.

3. The failure rate of a single node is increased. There are a large number of traffics between the SGSN and the GGSN, and the apparatus 230 has to obtain packets of the GTP protocol package-by-package, which requires a powerful processing capability of the apparatus 230. In addition, the SGSN and the GGSN are located in a core position within the GPRS backbone network, and their stable operations are very important. However, the addition of the apparatus 230 may increase the possibility of node failure.

4. An operation cost is increased. Two apparatus provided in this solution are: the apparatus 230, which detects the status of the GTP tunnel, and sends to the apparatus 250 the tunnel deleting notification packet; another apparatus 250 which receives the notification packet, and deletes corresponding session. The two apparatus are indispensable.

SUMMARY OF THE INVENTION

Embodiments of the present invention provide a data processing method and device to optimize a data processing procedure between a GGSN and an external data network, enable simple networking, reduce a failure rate of single node, and lower operation cost.

An aspect of the present invention provides a data processing method, including:

selecting, by a GGSN, data received by the GGSN;

deleting a GTP tunnel when the selected data is a tunnel deleting packet of a GTP;

obtaining information in the deleted GTP tunnel, and transmitting the information to a data information processing unit; and forbidding, by the data information processing unit, the information transmitted from the GGSN upon reception of the information transmitted from the GGSN Optionally, the selecting data received by a GGSN for the GGSN includes: selecting, by a data selecting unit of the GGSN, the data received by the GGSN. The transmitting the information to a data information processing unit includes: transmitting a tunnel deleting notification packet to the data information processing unit.

Optionally, the information includes an address of a mobile station, port information of the mobile station, the number of a protocol used by the mobile station and an external data network, an address of the external data network, and port information of the external data network.

Optionally, the forbidding the information includes:

adding the information into an address forbidden list preset by the data information processing unit.

Optionally, the method further includes:

transmitting a normal data packet to the data information processing unit when the data selected by the data selecting unit is the normal data packet; and setting up a GTP tunnel when the data selected by the data selecting unit is a GTP tunnel setting-up packet.

Optionally, the method further includes: when the data information processing unit receives the normal data packet from the data selecting unit, if the packet contains corresponding information in the address forbidden list, then deleting the information in the address forbidden list and transmitting the packet to the external data network; and if the packet does not contain the corresponding information in the address forbidden list, then transmitting the packet to the external data network.

Optionally, the method further includes: when the packet received by the data information processing unit originates from the external data network, if the packet contains corresponding information in the address forbidden list, then discarding the packet, otherwise transmitting the packet to the GGSN.

Optionally, the method further includes: after the data information processing unit receives the information transmitted from the data selecting unit, the data information processing unit transmitting a response packet to the data selecting unit.

Optionally, the method further includes: after the transmitting the information to the data information processing unit, if the data selecting unit receives the response packet from the data information processing unit, then terminating the processing; and if the data selecting unit has not received a response packet from the data information processing unit after a certain period of time, then resending the tunnel deleting notification packet to the data information processing unit.

Another aspect of the present invention provides a data processing device, including a data selecting unit and a data information processing unit, wherein:

the data selecting unit is disposed in a GGSN, and is adapted to select a GTP tunnel deleting packet, obtain information in a GTP tunnel and transmit the information to the data information processing unit; and the data information processing unit is adapted to receive information transmitted from the data selecting unit, and forbid the information.

Optionally, the information obtained by the data selecting unit includes an address of a mobile station, port information of the mobile station, the number of a protocol used by the mobile station and an external data network, an address of the external data network, and port information of the external data network.

Optionally, the data information processing unit is adapted to transmit a response packet to the data selecting unit upon reception of the information transmitted from the data selecting unit.

Optionally, the data information processing unit is embedded in the GGSN.

Optionally, the data information processing unit is connected in series between the GGSN and the external data network.

According to some embodiments of the present invention, the data with respect to the GTP tunnel is managed by categories in the GGSN apparatus, and the tunnel deleting notification packet is transmitted to the data information processing module in time, thus a wrong data forwarding may be avoided, and the operation mode is simple, in other words, the data information processing module operates only in the routing mode. Hence, the failure rate of a single node may be reduced, and the operation cost may be lowered.

BRIEF DESCRIPTIONS OF THE DRAWINGS

DETAILED DESCRIPTIONS OF THE EMBODIMENTS

Embodiments of the present invention provide a data processing method and device. Procedures of data selecting and data information processing are improved for the data received by a GGSN, to optimize a data processing between the GGSN and an external data network.

During GPRS operation, the addressing and data connection are implemented through routing management. For an internal network of GPRS, a GGSN is equivalent to a boundary gateway to an external data network, and for the external data network, the GGSN is equivalent to a conventional router. The GGSN supports encapsulation and de-encapsulation processes of a GTP tunnel, and also supports conventional data packet forwarding.

Based upon this, the data processing method according to an embodiment of the present invention includes the following steps.

The GGSN selects the data received. The selected data may be a GTP tunnel signaling packet or normal data packet. The GTP tunnel signaling packet may at least include one of a GTP tunnel setting-up packet and a GTP tunnel deleting packet.

A packet type of the selected data is determined, and corresponding processing is performed in accordance with the packet type of the selected data. If the selected data is a GTP tunnel setting-up packet, a tunnel is set up.

If the selected data is a GTP tunnel deleting packet, information is obtained from the GTP tunnel first, and then the tunnel is deleted. The information includes an address of a mobile station, port information of the mobile station, the number of a protocol used by the mobile station and an external data network, an address of the external data network, and port information of the external data network. Moreover, session-related information is stored in a forbidden list if a session exists between the mobile station and the external data network.

If the selected data is a normal data packet, corresponding processing is performed in accordance with the source of the normal data packet. If the data packet is from a SSGN, then it is further determined whether the session-related information is in the forbidden list. If the session-related information is in the forbidden list, corresponding information in the forbidden list is deleted, and the normal data packet is forwarded. If the session-related information is not in the forbidden list, the normal data packet is decapsulated and forwarded. If the data packet is from the external data network, then it is further determined whether the session-related information is in the forbidden list. If the session-related information is in the forbidden list, the normal data packet is discarded. If the session-related information is not in the forbidden list, the normal data packet is decapsulated and forwarded.

Figure 1:
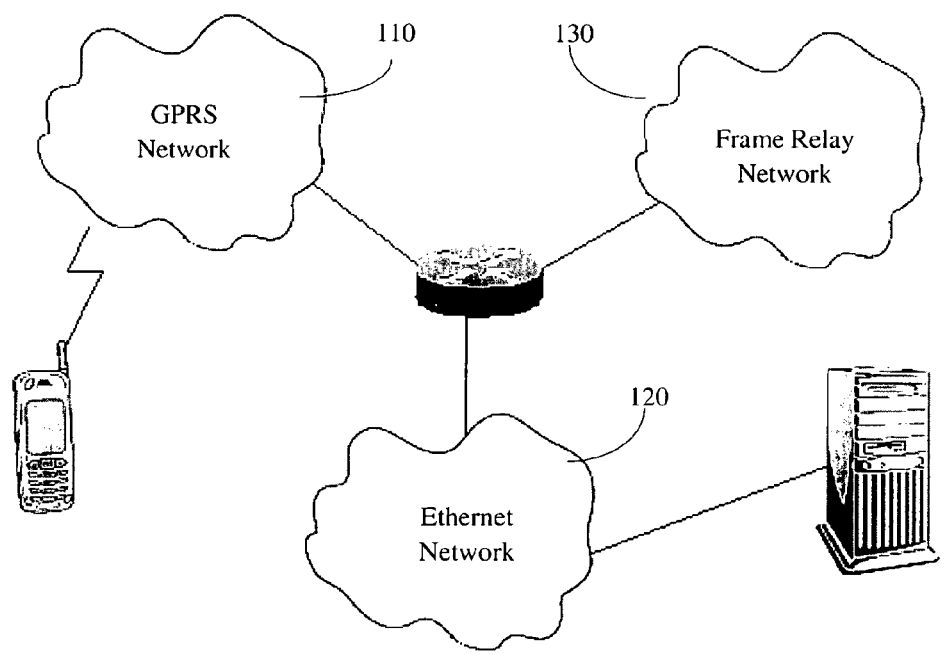
FIG. 1 is a schematic diagram of an application of a GPRS system in the prior art.
Figure 2:
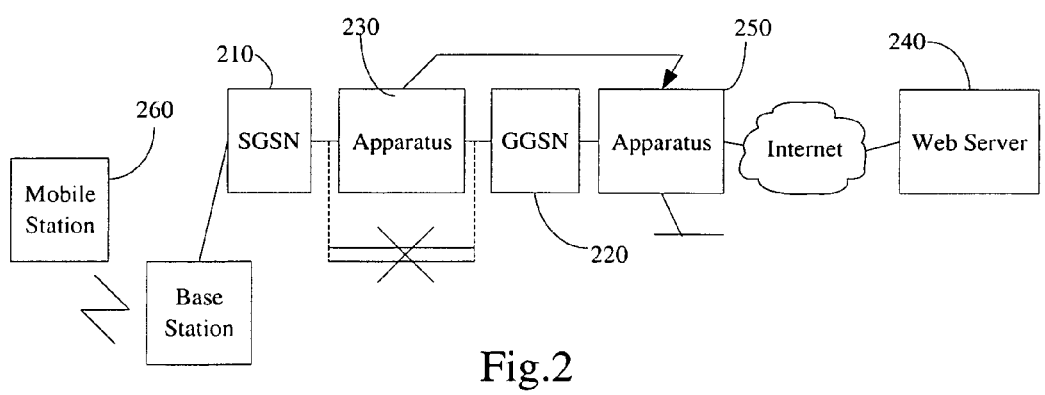
FIG. 2 is a schematic diagram of a packet processing procedure in the prior art.
Figure 3:
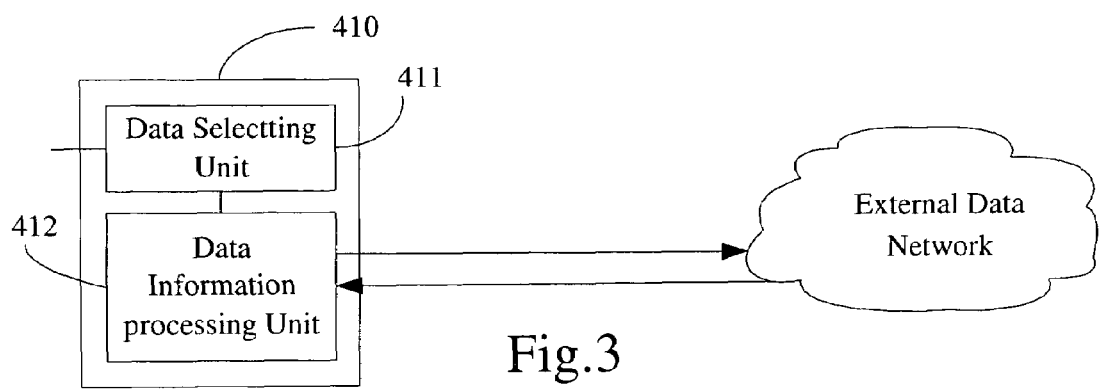
FIG. 3 is a schematic diagram of a data processing device according to an embodiment of the present invention.

Referring to FIG. 3, in an embodiment of the present invention, GGSN 410 includes a data selecting unit and a data information processing unit.

The data selecting unit 411 is configured to select data received by the GGSN 410, and to perform corresponding processing in accordance with the packet type of the selected data. If the selected data is a GTP tunnel setting-up packet, then a tunnel is set up. If the selected data is a normal data packet, then the packet is decapsulated and forwarded to the data information processing unit 412. If the selected data is a GTP tunnel deleting packet, then a GTP tunnel is deleted and information with respect to the GTP tunnel is obtained, and the information with respect to the GTP tunnel is forwarded to the data information processing unit 412. The obtained information includes an address of a mobile station, port information of the mobile station, the number of a protocol used by the mobile station and an external data network, an address of the external data network, and port information of the external data network.

The data information processing unit 412 is configured to receive data transmitted from the GGSN data selecting unit 411, and to perform corresponding processing in accordance with data type. If the data is the information with respect to the GTP tunnel, the information is forbidden. If the data is a normal data packet, corresponding processes are performed in accordance with the source of the normal data packet and the situation whether the related information therein is forbidden. The processes include forwarding the normal data packet, unforbiding related information and forwarding or discarding the normal data packet.

In addition, the data information processing unit 412 may also send a response packet to the GGSN data selecting unit 411 upon reception of the information with respect to the GTP tunnel forwarded from the GGSN data selecting unit 411.

Figure 4:
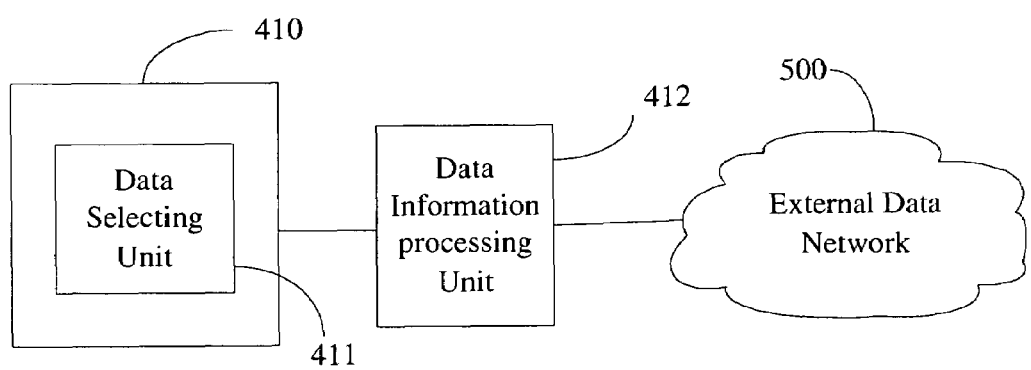
FIG. 4 is a schematic diagram of a data processing device according to another embodiment of the present invention.

Referring to FIG. 4, in another embodiment of the present invention, a data selecting unit 411 is disposed in a GGSN 410, and a data information processing unit 412 is disposed between the GGSN 410 and the external data network 500.

The embodiment illustrated in FIG. 3 is substantially similar to that illustrated in FIG. 4, except that in the embodiment illustrated in FIG. 3, both the data selecting unit 411 and the data information processing unit 412 are embedded in the GGSN 410, while in the embodiment illustrated in FIG. 4, the data selecting unit 411 is embedded in the GGSN 410 and the data information processing unit 412 is constituted by a physical apparatus which is connected with the GGSN 410 and an external data network 500 in series.

Figure 5:
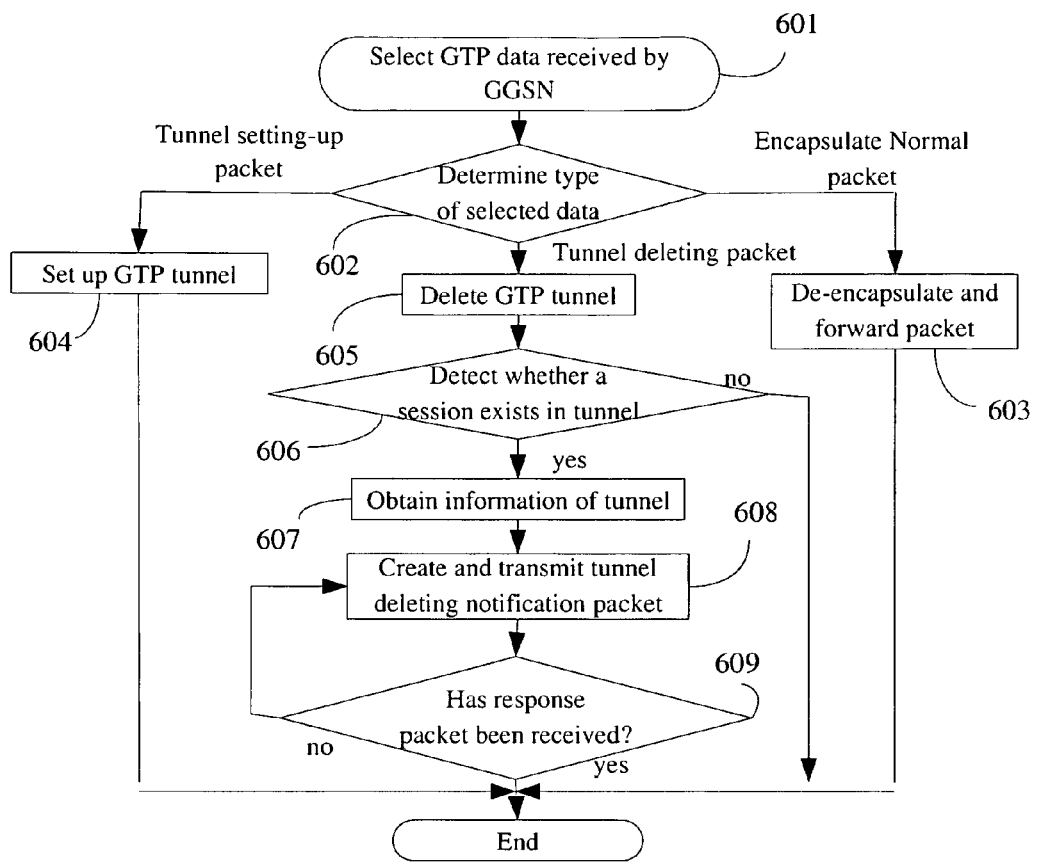
FIG. 5 is a flow chart of a method for processing data transmitted from an SGSN according to an embodiment of the present invention.

Referring to FIG. 5, it illustrates a flow chart of processing data in the data selecting unit.

In block 601, the data selecting unit selects data received by the GGSN. The selected data may be a GTP tunnel signaling packet or a normal data packet, and the GTP tunnel signaling packet at least includes one of a GTP tunnel setting-up packet and a GTP tunnel deleting packet.

In block 602, the data selecting unit determines a packet type of the selected data, and performs corresponding processing in accordance with the packet type.

In block 603, if the selected data is a normal data packet, the selected data is decapsulated and forwarded to the data information processing unit.

In block 604, if the selected data is the GTP tunnel setting-up packet, the data selecting unit sets up a GTP tunnel in accordance with the selected data.

In block 605, if the selected data is the GTP tunnel deleting packet, the GTP tunnel is deleted.

In block 606, it is detected whether there was any session in the deleted GTP tunnel, and if yes, then the flow goes to block 607, otherwise, the process ends.

In block 607, information with respect to the GTP tunnel is obtained, including an address of a mobile station, port information of the mobile station, the number of a protocol used by the mobile station and an external data network, an address of the external data network, and port information of the external data network.

In block 608, a tunnel deleting notification packet is created in accordance with the obtained information, and is sent to the data processing unit.

After the data selecting unit sends the tunnel deleting notification packet to the data information processing unit, the data information processing unit sends a response packet to the GGSN data selecting unit.

In block 609, the data selecting unit determines whether a response packet is received, and if yes, the process ends. If no response packet is received from the data information processing unit after a certain period, the flow returns to block 608, and the tunnel deleting notification packet is resent to the data information processing unit.

In the embodiment of the present invention, the packet received by the data information processing unit includes data transmitted from the data selecting unit or data transmitted from an external data network.

Figure 6:
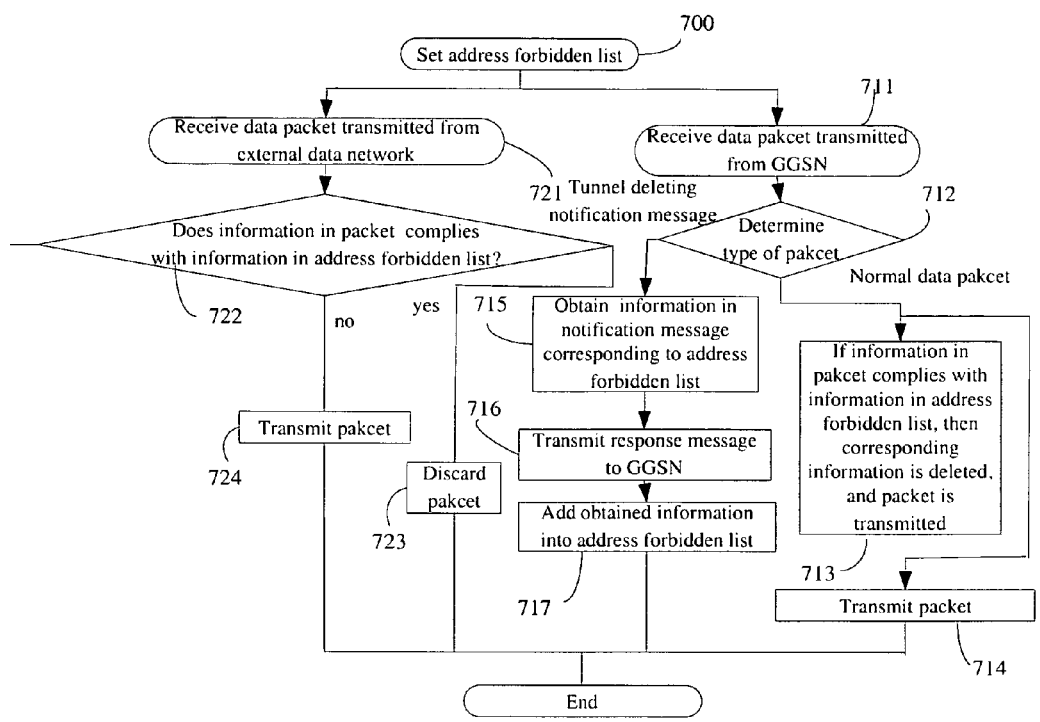
FIG. 6 is a flow chart of a method for processing data received by a data information processing unit according to an embodiment of the present invention.

Referring to FIG. 6, it illustrates a flow chart of processing data by the data information processing unit.

In block 700, an address forbidden list is preconfigured in the data information processing unit, and the address forbidden list at least includes an address of a mobile station, port information of the mobile station, the number of a protocol used by the mobile station and an external data network, an address of the external data network, and port information of the external data network.

Upon reception of a data, the data information processing unit performs corresponding processing in accordance with the source of the received data.

In block 711, the data from the data selecting unit is received.

In block 712, it is determined whether the received data is a normal data packet or a tunnel deleting notification packet.

In block 713, if the received data is a normal data packet, then information corresponding to the address forbidden list is obtained from the normal data packet. If the corresponding information in the normal data packet is consistent with corresponding information in the address forbidden list, then the corresponding information in the address forbidden list is deleted; and the normal data packet is transmitted to the external data network.

In block 714, if the corresponding information in the normal data packet is not consistent with the corresponding information in the address forbidden list, the normal data packet is transmitted directly to the external data network.

In block 715, if the received data is a tunnel deleting notification packet, then information corresponding to the address forbidden list is obtained from the tunnel deleting notification packet.

In block 716, a response packet is transmitted to the data selecting unit.

In block 717, the information in the tunnel deleting notification packet corresponding to the address forbidden list is added into the address forbidden list.

In block 721, the data information processing unit receives data from the external data network.

In block 722, the information corresponding to the address forbidden list is obtained from the data, and if the corresponding information in the data is consistent with the corresponding information in the address forbidden list, then the flow goes to block 723, otherwise, goes to block 724.

In block 723, the data is discarded.

In block 724, the data is transmitted to the GGSN.

In other words, for the data information processing unit, if the received data is from an external data network, the information in the data is obtained, to determine whether the data is forbidden. The information includes an address of a mobile station, port information of the mobile station, the number of a protocol used by the mobile station and an external data network, an address of the external data network, and port information of the external data network. If the information is forbidden, the data is discarded. If the information is not forbidden, the data is transmitted to the GGSN.

If the received data is a normal data packet from the data selecting unit, the information in the normal data packet is obtained to determine whether the information is forbidden. The information includes an address of a mobile station, port information of the mobile station, the number of a protocol used by the mobile station and an external data network, an address of the external data network, and port information of the external data network. If the information is forbidden, the normal data is unforbidden and transmitted to the external data network.

If the received data is a tunnel deleting notification packet from the data selecting unit, the information in the tunnel deleting notification packet is obtained, and the information is forbidden. The information includes an address of a mobile station, port information of the mobile station, the number of a protocol used by the mobile station and an external data network, an address of the external data network, and port information of the external data network.

The forgoing descriptions are merely illustrative of the preferred embodiments of the invention, but the scope of the invention shall not be limited to these embodiments. Variations and alternatives readily apparent to those skilled in the art in light of the disclosure of the invention shall fall within the scope of the invention.

What is claimed is:

1. A data processing method, comprising:
   selecting, by a Gateway GPRS Supporting Node (GGSN), data received by the GGSN;
   deleting a GPRS Tunnel Protocol (GTP) tunnel when selected data is a GTP tunnel deleting packet;
   obtaining information with respect to the GTP tunnel, and transmitting the information to a data information processing unit;
   forbidding, by the data information processing unit, the information transmitted from the GGSN when receiving the information transmitted from the GGSN, wherein forbidding the information transmitted from the GGSN includes adding the information into an address forbidden list preconfigured by the data information processing unit;
   transmitting a normal data packet to the data information processing unit when the data selected by a data selecting unit in the GGSN is the normal data packet; and
   setting the GTP tunnel when the data selected by the data selecting unit is a GTP tunnel setting-up packet,
   wherein when the data information processing unit receives the normal data packet from the data selecting unit, if the normal data packet contains corresponding information in the address forbidden list, deleting the information in the address forbidden list and transmitting the normal data packet to an external data network; and if the normal data packet does not contain corresponding information in the address forbidden list, transmitting the normal data packet to the external data network.

2. The method according to claim 1, wherein the information comprises an address of a mobile station, port information of the mobile station, the number of a protocol used by the mobile station and the external data network, an address of the external data network, and port information of the external data network.

3. The method according to claim 1, further comprising: when the data received by the data information processing unit originates from the external data network, if the data contains corresponding information in the address forbidden list, then discarding the data, otherwise transmitting the data to the GGSN.

4. The method according to claim 1, further comprising: after the data information processing unit receives the information transmitted from the data selecting unit, transmitting by the data information processing unit a response packet to the data selecting unit.

5. The method according to claim 4, further comprising: after transmitting the information to the data information processing unit, if the data selecting unit receives the response packet from the data information processing unit, terminating the processing; and if the data selecting unit has not received the response packet from the data information processing unit after a certain period, resending the tunnel deleting notification packet to the data information processing unit.

6. A data processing device, comprising:
a data selecting unit; and
a data information processing unit, wherein:
the data selecting unit is configured to select data received by a Gateway GPRS Supporting Node (GGSN);
when the data selected by the data selecting unit is a GPRS Tunnel Protocol (GTP) tunnel deleting packet, the data selecting unit is further configured to delete a GTP tunnel, obtain information with respect to the GTP tunnel, and transmit the information to the data information processing unit;
the data information processing unit is configured to forbid the information transmitted from the data selecting unit through adding the information into an address forbidden list preconfigured by the data information processing unit;
when the data selected by the data selecting unit is a normal data packet, the data selecting unit is further configured to transmit the normal data packet to the data information processing unit;
if the normal data packet transmitted from the data selecting unit contains corresponding information in the address forbidden list, the data information processing unit is configured to delete the information in the address forbidden list and transmit the normal data packet to an external data network; and
if the normal data packet transmitted from the data selecting unit does not contain corresponding information in the address forbidden list, the data information processing unit is configured to transmit the normal data packet to the external data network.

7. The device according to claim 6, wherein the information obtained by the data selecting unit comprises an address of a mobile station, port information of the mobile station, the number of a protocol used by the mobile station and the external data network, an address of the external data network, and port information of the external data network.

8. The device according to claim 6, wherein the data selecting unit is configured to set up the GTP tunnel when the data selected by the data selecting unit is a GTP tunnel setting-up packet.

9. The device according to claim 6, wherein the data selecting unit is disposed in the GGSN.

10. The device according to claim 6, wherein the data information processing unit is embedded in the GGSN.

11. The device according to claim 6, wherein the data information processing unit is connected in series between the GGSN and the external data network.

* * * * *